(12) United States Patent
Gaur

(10) Patent No.: US 10,348,910 B2
(45) Date of Patent: Jul. 9, 2019

(54) METHOD AND SYSTEM FOR PROVIDING A PERSONALIZED PRODUCT CATALOG ENABLING RATING OF COMMUNICATION EVENTS WITHIN A USER DEVICE

(71) Applicant: Anshoo Gaur, Naperville, IL (US)

(72) Inventor: Anshoo Gaur, Naperville, IL (US)

( * ) Notice: Subject to any disclaimer, the term of this patent is extended or adjusted under 35 U.S.C. 154(b) by 0 days.

(21) Appl. No.: 15/165,608

(22) Filed: May 26, 2016

(65) Prior Publication Data

US 2017/0118353 A1 Apr. 27, 2017

Related U.S. Application Data

(60) Provisional application No. 62/246,660, filed on Oct. 27, 2015.

(51) Int. Cl.
| | | |
|---|---|---|
| *H04M 11/00* | (2006.01) | |
| *H04M 15/00* | (2006.01) | |
| *H04M 15/28* | (2006.01) | |
| *H04W 4/24*  | (2018.01) | |

(52) U.S. Cl.
CPC ......... *H04M 15/61* (2013.01); *H04M 15/28* (2013.01); *H04M 15/41* (2013.01); *H04M 15/70* (2013.01); *H04M 15/71* (2013.01); *H04M 15/72* (2013.01); *H04M 15/858* (2013.01); *H04W 4/24* (2013.01); *H04M 2215/8183* (2013.01)

(58) Field of Classification Search
CPC ...... H04M 15/28; H04M 15/41; H04M 15/61; H04M 2215/8183; H04M 17/00; H04M 2215/32; H04W 4/24; G06Q 20/32

USPC .......................................... 379/265.01–266.1
See application file for complete search history.

(56) References Cited

U.S. PATENT DOCUMENTS

| | | | |
|---|---|---|---|
| 6,408,174 B1 | 6/2002 | Steijer | |
| 6,741,850 B1 | 5/2004 | Park | |
| 8,484,130 B2 | 7/2013 | Irwin et al. | |
| 8,861,691 B1 * | 10/2014 | De | H04M 15/41 |
| | | | 379/111 |
| 2002/0097855 A1 | 7/2002 | Neudeck | |
| 2003/0003894 A1 | 1/2003 | Kumar | |
| 2006/0116105 A1 | 6/2006 | Frankel et al. | |
| 2007/0274490 A1 | 11/2007 | Hu et al. | |
| 2009/0291665 A1 * | 11/2009 | Gaskarth | G06Q 30/04 |
| | | | 455/405 |

(Continued)

*Primary Examiner* — Khoi H Tran
*Assistant Examiner* — B M M Hannan
(74) *Attorney, Agent, or Firm* — Hayes Soloway P.C.

(57) ABSTRACT

Disclosed is a method and a user device for real time processing of rating associated to one or more telecommunication services. The user device comprises a personalized product catalogue module for receiving a personalized product catalogue comprising one or more telecommunication services. The personalized product catalogue further comprises a plurality of rules associated with rating of each of the one or more telecommunication services. The user device further may comprise a monitoring module for monitoring an event triggered for establishing a communication. The user device may further capture service consumption data pertaining to the appropriate telecommunication service being consumed for the processing of the event. The user device may further rate the event based on the service consumption data and at least one rule, of the plurality of rules, stored in the personalized product catalogue corresponding to the appropriate service.

15 Claims, 3 Drawing Sheets

(56) References Cited

U.S. PATENT DOCUMENTS

| | | | |
|---|---|---|---|
| 2011/0244826 A1* | 10/2011 | Krishnan | H04M 15/00 |
| | | | 455/405 |
| 2012/0101952 A1* | 4/2012 | Raleigh | G06Q 30/016 |
| | | | 705/304 |
| 2012/0143735 A1* | 6/2012 | Pascal Leo | G06Q 30/04 |
| | | | 705/34 |
| 2012/0157043 A1* | 6/2012 | LaJoie | G06Q 30/0256 |
| | | | 455/407 |
| 2013/0132854 A1* | 5/2013 | Raleigh | G06F 3/0482 |
| | | | 715/738 |
| 2013/0332310 A1* | 12/2013 | Danton | G09G 5/14 |
| | | | 705/26.8 |
| 2014/0199961 A1* | 7/2014 | Mohammed | H04L 63/0428 |
| | | | 455/406 |
| 2014/0273942 A1 | 9/2014 | Rotem | |
| 2014/0378091 A1* | 12/2014 | Irwin | H04M 15/59 |
| | | | 455/405 |
| 2015/0181045 A1* | 6/2015 | Lang | H04M 15/41 |
| | | | 705/34 |
| 2015/0264189 A1 | 9/2015 | Morgan et al. | |
| 2015/0327042 A1* | 11/2015 | Kempf | H04W 4/003 |
| | | | 455/406 |
| 2015/0341504 A1* | 11/2015 | Yang | H04M 15/58 |
| | | | 455/407 |
| 2016/0239168 A1* | 8/2016 | Glazer | G06F 3/0346 |

\* cited by examiner

METHOD AND SYSTEM FOR PROVIDING A PERSONALIZED PRODUCT CATALOG ENABLING RATING OF COMMUNICATION EVENTS WITHIN A USER DEVICE

CROSS-REFERENCE TO RELATED APPLICATIONS AND PRIORITY

The present application claims priority from U.S. Provisional Patent Application. No. 62/246,660 dated 27 Oct. 2015.

TECHNICAL FIELD

The present subject matter described herein, in general, relates to communication systems, and more particularly to a method and system for rating, charging and billing telecommunication usage events within a user device.

BACKGROUND

In the present scenario, when a user subscribes a service from a telecommunication service provider and starts using the service, data related to the service consumed is received, rated and charged in a centralized manner using either an Intelligent Network (IN) or specialized Billing or Revenue Management systems. Effective revenue management requires a seamless flow of data between the serving network and downstream systems for billing, fraud management, partner reconciliation and others. The data must be managed carefully so that records are not lost, duplicated, corrupted or rejected by the receiving systems. Breakdowns can have serious implications. The aforementioned conventional systems have a number of deficiencies which occur while executing operations right from transferring the data of a call detail record of the service consumed to the server till the billing of the service, consumed by the user, via the server of the billing management system.

A central control point of the billing management systems is usually bulky, highly capital intensive. This is because servers present in the central control point monitor the data of service consumption for a large volume of users which can run into several billion events per day. The central control point functions as a single point of failure for the system requiring massive investment on high availability and redundancies. Therefore, continuous maintenance and monitoring of secure working of the central control point is required in order to conduct hassle free operations in the central control point. Further, the existing billing management systems require monitoring each and every event made by users, capturing the raw call detail records, employing mediation system for formatting the raw detail records and a rating system for rating the call detail records and billing system for final billing.

The mediation system employed is responsible for executing a formatting process which is a pre-requisite process for facilitating the rating, charging and billing of the services consumed. In the formatting process, a call detail record of an event from a user device is sent to the central control point. It is to be noted that, an event is a single billable occurrence of the service, typically captured electronically by a network. The event along with attributes associated with the said event collectively forms the Call Detail Record (CDR). A data collector in the network switch captures the usage in a raw CDR. The raw versions of the CDR are then converted by the mediation system into a format understandable by the billing system. The mediation system applies various rules on the CDRs to process the CDRs. In one example, the mediation system may mark the international calls based on the dialed number (B-Number). In another example, the mediation system may mark on-net calls based on A-Number and B-Number. Once the CDRs are processed, the mediation System pushes the CDRs to the Billing System using File Transfer Protocol because usually the mediation system and the rating systems run on different machines.

The rating system receives the events in the form of call detailed records formatted by the mediation system. The rating system may process such CDRs describing the usage of a service. It must be understood that the CDR is a string of data that contains call information including call date, call time, call length, calling party, called party, etc., which are used to rate the events. The rating system further validates the CDR for any duplicate records, stores such CDR for later verification, determines the user account associated with the user, recognizes the event source, calculates cost/price of the event as per the rate plan associated with the service and then applies any discount if applicable. The billing system selects an account and obtains CDRs rated corresponding to the account for aggregation of all non-recurring, periodic, and chargeable events. The billing system also calculates all outstanding charges and available discounts and bonuses.

Therefore, apart from high maintenance and high capital investment, the current billing management, the existing billing management systems involve a time consuming back end processing for formatting the call detail records, rating and billing as described further below. Thus the overall back end processing system becomes bulky and involve time consuming activities, especially considering the processing of multiple events for such a large number of users consuming numerous services.

Additionally, the usage data captured by the central control point, in the existing billing systems, may vary from the actual usage recorded at the user's device thereby leading to discrepancy in the rating, charging and the billing of the services. Many a times, the carriers are found to usually count data correctly, but sometimes, the carriers tend to over count and hence potentially overcharge the user. For example, when the user uses applications that stream video or audio, and particularly when coverage is weak or unreliable, the user may be incorrectly overcharged due to error in capturing the correct usage. The Research has indicated that even typical use of a phone could lead the data to be over counted by 5 to 7 percent. This overcharging of the user is not only wrong but can expose the telecommunication operators to fraud lawsuits. Further, the existing system may not constantly update about the user's service consumption and the method it is rated making the whole process opaque for the user. Furthermore, the user does not receive any recommendation based on his service consumption and the availability of the services in the product catalogue.

SUMMARY

This summary is provided to introduce concepts related to systems and methods for rating an event within a user device and the concepts are further described below in the detailed description. This summary is not intended to identify essential features of the claimed subject matter nor is it intended for use in determining or limiting the scope of the claimed subject matter.

In one implementation, a method for real time processing rating of one or more telecommunication services is described. The method may comprise receiving, via a user device, a personalized product catalogue comprising one or more telecommunication services, wherein the one or more services belongs to one or more telecommunication service providers. In one example, the user device may be one of a mobile phone, a tablet, a laptop computer, a wearable device, and a set-top box or a set top unit. The personalized product catalogue further comprise a plurality of rules associated with rating of each of consumption or subscription of the one or more telecommunication services. In an aspect, the plurality of rules comprises only the offers applicable to the user and data related to the rating of the one or more telecommunication services. The method may further comprise monitoring, via the user device, an event triggered for establishing a communication. The method may further comprise enabling, via the user device, the user to select an appropriate telecommunication service, of the one or more telecommunication services, belonging to an appropriate service provider, of the one or more service providers, in order to process the event. The method may further comprise capturing, via the user device, service consumption data pertaining to the appropriate telecommunication service being consumed for the processing of the event. The method may further comprise rating, via the user device, the event based on the service consumption data and at least one rule, of the plurality of rules, stored in the personalized product catalogue corresponding to the appropriate service.

In another implementation, a user device for real time processing of rating associated to one or more telecommunication services is described. The user device may comprise a processor and a memory coupled with the processor, wherein the processor is capable of executing programmed instructions stored in the memory. The processor may execute a programmed instruction for receiving a personalized product catalogue comprising one or more telecommunication services, wherein the one or more telecommunication services belongs to one or more service providers, and wherein the personalized product catalogue further comprises a plurality of rules associated with rating of consumption data or subscription data of one or more telecommunication services. In an aspect, the plurality of rules comprises only the offers applicable to the user and data related for the rating of the one or more telecommunication services. The processor may execute a programmed instruction for monitoring an event triggered for establishing a communication. The processor may execute a programmed instruction for enabling a user, via the user device to select an appropriate telecommunication service, of the one or more telecommunication services, belonging to an appropriate service provider, of the one or more service providers, in order to process the event. The processor may execute a programmed instruction for capturing service consumption data pertaining to the appropriate telecommunication service being consumed for the processing of the event. The processor may execute a programmed instruction for rating the event based on the service consumption data and at least one rule, of the plurality of rules, stored in the personalized product catalogue corresponding to the appropriate service.

In yet another implementation, a non-transitory computer readable medium storing a program for facilitating real time processing of rating associated to one or more telecommunication services is described. The program may comprise an instruction for receiving a personalized product catalogue comprising one or more telecommunication services, wherein the one or more telecommunication services belongs to one or more service providers, and wherein the personalized product catalogue further comprises a plurality of rules associated with rating of consumption data or subscription data of one or more telecommunication services. In an aspect, the plurality of rules comprises only the offers applicable to the user and data related for the rating of the one or more telecommunication services. The program may further comprise an instruction for monitoring an event triggered for establishing a communication. Further, the program may comprise an instruction for enabling the user to select, via the user device, an appropriate telecommunication service, of the one or more telecommunication services, belonging to an appropriate service provider, of the one or more service providers, in order to process the enabling a user for selecting an appropriate telecommunication service, of the one or more telecommunication services, belonging to an appropriate service provider, of the one or more service providers, in order to process the event. The program may further comprise an instruction for capturing service consumption data pertaining to the appropriate telecommunication service being consumed for the processing of the event. Further, the program may comprise an instruction for rating the event based on the service consumption data and at least one rule, of the plurality of rules, stored in the personalized product catalogue corresponding to the appropriate service.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
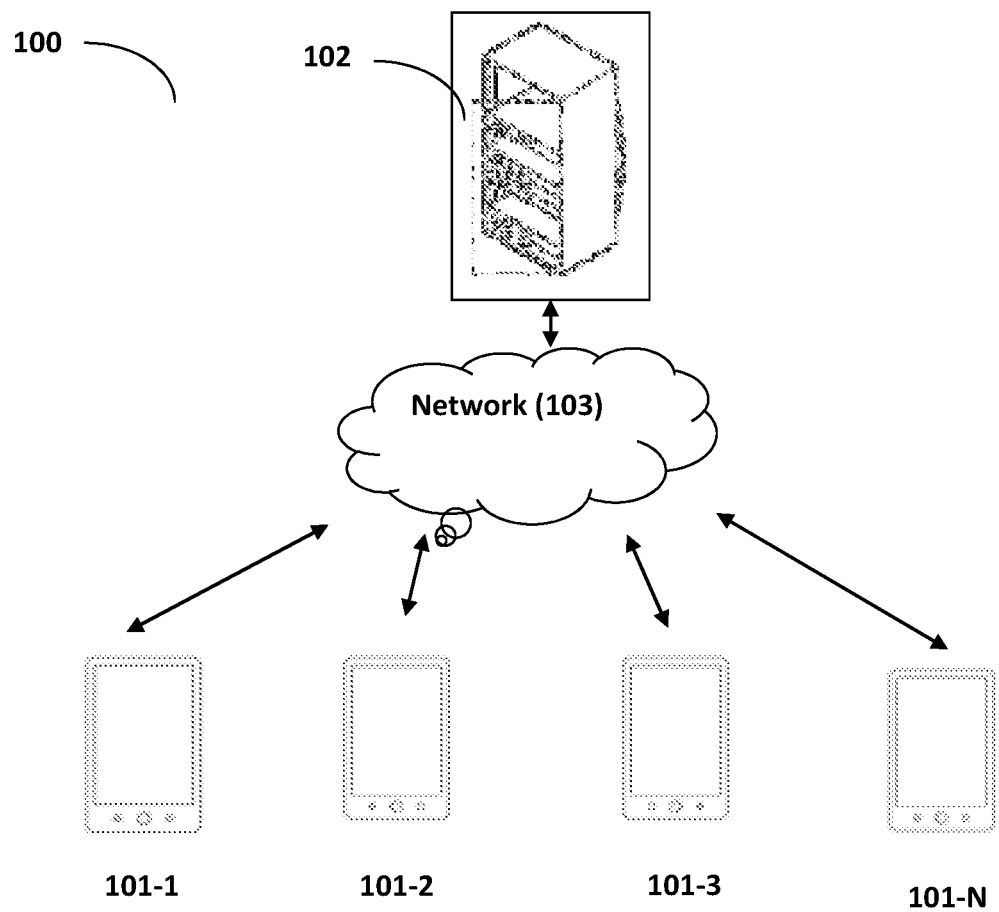
FIG. 1 illustrates a network implementation 100 of a user device 101 facilitating real time processing of rating associated with one or more telecommunication services, in accordance with an embodiment of the present subject matter.

Method(s) and user device(s) for real time processing of rating associated to one or more telecommunication services are described. In accordance with aspects of the present disclosure, a user device belonging to user, and not the bulky servers as discussed in the background art, is enabled to rate each event triggered in order to establish a communication between the user device and a network. Therefore, the present disclosure enables in offloading the computationally intensive processing of the rating of events by the servers employed in the existing art on multiple user devices. In an aspect, the ratings are processed based on rating rules stored in a memory of the user device. In accordance with aspects of the present disclosure, before processing a current event, the user device may be enabled to display, to the user, network signal quality of multiple service providers, charge rates and the plurality of rating rules, one or more services and expected charge applicable to the process the current event, that may facilitate the user to select an appropriate service provider to process the current event. During the event processing, the user device may be enabled to display, to the user, the real-time cost of the event and a remaining usage till the time that cost holds true. For example, consider one or more voice calls are charged on minute basis and the rate as per the rate plan in the personalized product catalogue is USD 0.2 per minute; now when the call crosses a time length of one minute, the display means of the user device may display the charge as USD 0.4 and that rate may be applicable till the completion of call time of two minutes. The display of real time rating will enable the user to take decision on whether to continue the call as he is already charged for the next minute or to end a call if the current minute is about to end and the call may be concluded. The present disclosure therefore provides an effective and efficient mechanism for rating the event within the user device thereby facilitating elimination of all the computationally intensive back end processes and reducing the servers employed for executing the said back end processes.

It is to be noted that the one or more telecommunication services may comprise fixed-network services (data retail, Internet retail, voice retail and wholesale) and mobile services. The Fixed-network services may further comprise all dedicated/private line, packet and circuit-switched access services (for example, frame relay, asynchronous transfer mode, IP, Integrated Services Digital Network, DSL, multichannel multipoint distribution service [MMDS] and satellite) retail revenue. All types of transmissions further comprising non-voice data, image, video, fax, interactive services and even voice may be carried by these services regardless of whether the source format is analog or digital. The one or more telecommunication services comprises radio network services, television network services, internet services, satellite based services (satellite television, satellite broadcasting channels), voice telephone services, mobile data services, Packet-switched data transmission services, Circuit-switched data transmission services, telex services, Facsimile services, Private leased circuit services, and combinations thereof.

It is to be noted that each event is processed through multiple telecommunication services (hereinafter referred as services) provided by multiple service providers. The user may be interested in few of the multiple services. Therefore, the user, via the user device, may select one or more services provided by the multiple services providers. The services selected may be packaged in form of a personalized product catalogue that is sent to the user device. In accordance with aspects of the present disclosure, each service is responsible for processing events such as voice call, text messaging, internet data, and the like.

It must be understood that an event is a single billable occurrence of service consumption, typically captured electronically by a network. For example, when a user makes a telephone call, an event is generated containing information about that phone call. The information may include the call duration, the time of day the call was made and the number that was called. The event along with attributes associated with the event is called event detail record. The user device therefore captures service consumption data in the form of event detail record after execution of the event or at intermediate points in time for long running services. The event detail records are in turn rated by the user device using a plurality of rules stored in the personalized product catalogue corresponding to the one or more services in the product catalogue.

It must be further understood that a rate is the charge/price for the occurrence of an event. In an example, the rate may include charge for the duration of the telephone call (e.g. "0.040 USD per 1 minute"). In another example, the rate may include charge for accessing amount of data (e.g. 1.USD for 1 MB download) or as per the quality of service. In yet another example, the rate may include charge for accessing a pack of channels by a satellite television service provider. Rating depends upon the type of event and other parameters of the event. Therefore, the rating is the process of determining the charge/price of individual events. For example, the price for a two minutes' call is 0.080 USD with the rate of 0.040 USD per minute.

In an aspect of the present disclosure, each rule may indicate rating to be applied for a particular event depending upon the event information including event date, event time, event length, location from where the event was performed. According to the present disclosure, when an event is triggered or an event is at intermediate points in case of long term services, service consumption data of the event is monitored and stored automatically in the user device. The event may be rated based on the service consumption data and at least one rule, of the plurality of rules, stored in the personalized product catalogue corresponding to the service facilitating the event. In one example, a voice call may be rated based on a rule "rating the voice call is 0.1 USD/second during daytime and 0.075 USD/second during night". Therefore, in this example, the rating of the voice call may depend based upon the time at which the call is being performed. The rated event detailed record is stored and displayed on the user device for the acknowledgement of the user. The one or more rated event detail records may be used later by the user device for billing. The billing may happen on real time basis, on a time shift basis between specified time intervals or even at intermediate points in time for long term services. The user, via the user device, may facilitate the payment of the billed event detail records.

While aspects of described system and method for rating the event within the user device may be implemented in any number of different computing systems, environments, and/or configurations, the embodiments are described in the context of the following exemplary system.

Referring now to FIG. 1, a network implementation 100 of the user device 101 facilitating real time processing an event associated with one or more telecommunication services, in accordance with an embodiment of the present subject matter. In an embodiment, the user device 101 receives a personalized product catalogue comprising one or more telecommunication services, wherein the one or more telecommunication services belongs to one or more service providers, and wherein the personalized product catalogue further comprises a plurality of rules associated with rating of each of consumption or subscription of one or more telecommunication services and comprising of only the offers that are applicable to the user and any related data that would be necessary for rating the one or more telecommunication services. The user device 101 may monitor each event which is initiated for establishing a communication. Furthermore, after monitoring of the event, the user device 101 may further capture service consumption data pertaining to the appropriate telecommunication service being consumed for the processing of the event. The service consumption data may be monitored on the basis of time of event, duration of event, magnitude of the event, location of the user device 101 when the event was performed and further arrange all the parameter in the event detail record. The personalized product catalogue comprises the plurality of rules for rating the event detail record belonging to the particular event based on the service consumption data. It must be noted that at least one rule, of the plurality of rules, stored in the personalized product catalogue corresponds to the appropriate service. The one or more rated event detail record may either be billed on real time basis or after specified time intervals. After generating the bill within the user device 101, the user device 101 may facilitate payment for the billed amount on approval of the billed event detail records.

It will be understood that the communication service provider's server 102 may be accessed by multiple users through one or more user devices 101-1, 101-2 . . . 101-N, collectively referred to as user devices 101 (or user 101) hereinafter, or applications residing on the user devices 101. Examples of the user device 101 include a portable computer, a personal digital assistant, a handheld device, a workstation, and the like. The communication service provider's server 102 may belong to one or more service providers. In alternative embodiment, a separate communication service provider's server 102 may be employed for each individual service provider. The user devices 101 are communicatively coupled to the communication service provider's server 102 through a network 103.

In one implementation, the network 103 may be a wireless network, a wired network or a combination thereof. The network 103 can be implemented as one of the different types of networks, such as intranet, local area network (LAN), wide area network (WAN), the internet, and the like. The network 103 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 103 may include a variety of network devices, including routers, bridges, servers, computing devices, storage devices, and the like.

Figure 2:
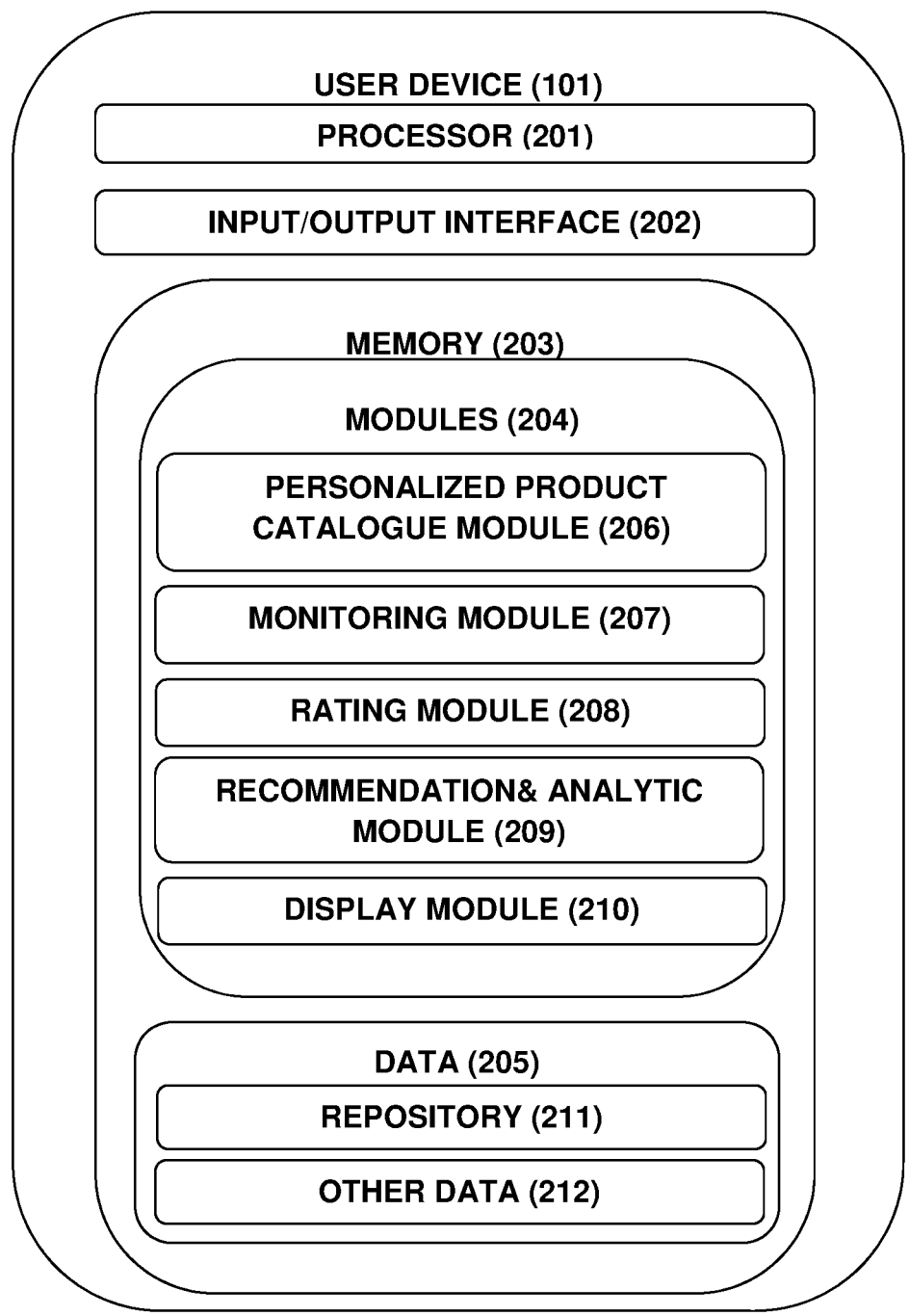
FIG. 2 illustrates the user device 101, in accordance with an embodiment of the present subject matter.

Referring now to FIG. 2, the user device 101 is illustrated in accordance with an embodiment of the present subject matter. In one embodiment, the user device 101 may include at least one processor 201, an input/output (I/O) interface 202, and a memory 203. The at least one processor 201 may be implemented as one or more microprocessors, microcomputers, microcontrollers, digital signal processors, central processing units, state machines, logic circuitries, and/or any devices that manipulate signals based on operational instructions. Among other capabilities, the at least one processor 201 is configured to fetch and execute computer-readable instructions stored in the memory 203.

The I/O interface 202 may include a variety of software and hardware interfaces, for example, a web interface, a graphical user interface, and the like. The I/O interface 202 may allow the user device 101 to interact with a user directly or through the client devices 103. Further, the I/O interface 202 may enable the user device 101 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting a number of devices to one another or to another server.

The memory 203 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 203 may include modules 204 and data 205.

The modules 204 include routines, programs, objects, components, data structures, etc., which perform particular tasks or implement particular abstract data types. In one implementation, the modules 204 may include a personalized product catalogue module 206, a monitoring module 207, a rating module 208, a recommendation and analytic module 209, a display module 210 and other modules (not shown in figure). The other modules may include programs or coded instructions that supplement applications and functions of the user device 101.

The data 205, amongst other things, serves as a repository 211 for storing data processed, received, and generated by one or more of the modules 204. The data 205 may also include the personalized product catalogue database, a user device database, and other data 212. The other data 212 may include data generated as a result of the execution of one or more modules in the other module 218.

In one implementation, at first, the user may use the user device 101 to access the personalized product catalogue provided by the communication service provider server 103 via the I/O interface 202. The user may surf through the list of services and find the appropriate service with a suitable rate plan for the user. The user may select one or more services using the I/O interface 202 in order to receive the personalized product catalogue. The personalized product catalogue may contain only those services pre-selected by the user of the user device 101. In order to receiving the product catalogue, the user device 101 may send a request protocol for receiving product catalogue.

Personalized Product Catalogue Module

In one implementation, the personalized product catalogue module comprises instructions for receiving information or data from other devices or modules 204. The personalized product catalogue module may send a file transfer protocol to the communication service provider's server 102 in order to receive the personalized product catalogue comprising services along with rate plan and the plurality of rules associated with the service opted by the user. The personalized product may comprise a plurality of rules for rating of each of consumption or subscription of one or more telecommunication services and comprising of only the offers that are applicable to the user and any related data that would be necessary for rating the one or more telecommunication services The personalized product catalogue module may further enable updating the personalized product catalogue after predefined time intervals or as and when the user subscribes or unsubscribes to an offer or an offer subscribed by the user has been modified or expired.

In one embodiment, since memory in the user device 101 or SIM memory may be limited, the product catalogue may only contain packaged information/data about services subscribed by the user. It must be understood that the SIM memory used today is limited to include information pertaining to the subscriber and the network provider and may further contain data/voice data. However, the present disclosure enables to introduce in the SIM user device memory, the personalized product catalogue specifically composed for the user of the device 101. The user device 101 may periodically update the services consumed along with the rating/billing of the services to a cloud server communicatively coupled with the user device 101. The updating process may be executed automatically by the user device 101 or the network by accessing a Uniform Resource Locator (URL) associated with the cloud server. This in turn facilitates in offloading the memory consumed within the user device 101 and the freed memory may be available to store future event usage and billed consumption data.

In an embodiment, tables below illustrate few examples of the plurality of rules, to be applied for an appropriate event, included in the product catalogue.

TABLE 1

| Type of Event | Plurality of rules | Rate (USD/Minute) |
| --- | --- | --- |
| Voice call | Local | 0.1 |
| | Long distance | 0.2 |
| | International | 0.5 |
| | Roaming-incoming | 0.1 |
| | Roaming-outgoing | 0.2 |
| | Friends-local calls only as per selected plan | 0.03 |
| | Family- All calls | 0.02 |
| | Night hours (11 pm-5 am) | 0.02 |

TABLE 2

| Type of event | Plurality of rules | Rate (USD/message of 140 characters) |
| --- | --- | --- |
| Text Messaging | Local | 0.1 |
| | Long distance | 0.2 |
| | International | 0.5 |
| | Roaming-outgoing | 0.2 |
| | Friends-local and long distance | 0.03 |
| | Family- All messages | Free |
| | Night hours | 0.02 |

TABLE 3

| Type of event | Plurality of rules | Rate (USD/1 Megabyte) |
| --- | --- | --- |
| Data usage | Data consumption at home circle | 0.1 |
| | Data consumption from circles other than home circle | 0.2 |
| | Data consumption for selected instant messengers | 0.01 |
| | Data consumption at Night hours | 0.02 |

TABLE 4

| Type of event | Plurality of rules | Rate (USD/Day) |
| --- | --- | --- |
| Television channels pack usage | Base pack | 0.8 |
| | First Regional Pack | Free |
| | Second regional Pack | 0.2 |
| | High Definition Subscription | 0.2 |
| | International Channels | 0.4 |
| | Single channel subscription | 0.2 |

Monitoring Module

In one implementation, the monitoring module may comprise instructions to monitor the service consumption of one or more events. The monitoring module may monitor one or more events triggered for establishing a communication. In an implementation, the triggering of the one or more events for establishing a communication may be initiated by the user, or by the network or by the user device 101. In an example, the communication may be triggered by the user when the user makes/receives a call or browses the internet. In another example, the communication may be triggered by the user device to upload statistics data or for user device's system update check. In yet another example, the communication may be triggered by the network or by other systems comprising operating system providers for updates pushed by the Original Equipment Manufacturers (OEM. There may be different type of events comprising a voice call, a short text message, an internet data streaming, a multimedia message and the like. The monitoring module may monitor the event with parameters comprising event executed by a user, event executed by other users and thereby connecting the user, event staring time, duration of the event and event type. The monitoring module may further monitor result of the event (whether the event was accomplished or failed), any faults encountered during the event and any facilities such as call diversion or call waiting was used.

In one implementation, the present disclosure may be capable of enriching the consumption data related information or deriving metadata pertaining the consumption data related information. For example, the user device 101 may enrich the consumption data to derive metadata indicative of determining whether an event comprising a voice call is a long distance call or a local call, whether the call is made within a vicinity of a roaming network or a home network, whether call is made at peak time, and whether a call is made within friends or family circle, and the like. The metadata may include specific attributes for different event types such as voice calls, internet/intranet data, SMS/MMS messages, etc. In one embodiment, the user device 101 may use the metadata in order to further display, to the user, a list of the appropriate service providers, the appropriate services/offers and applicable rates/charges belonging to each service provider corresponding to each service/offer instantly.

In one implementation, the monitoring module may capture all the details of the event executed and the consumption data of the particular event into a specific format to form the event detail record. The capturing of the event detail may run simultaneously with the monitoring process or it may also be executed after the termination of the event.

Rating Module

In one implementation, the rating module may obtain one or more event detail records from the memory 203 of the user device 101 for rating of the one or more event detail records. The rating module extracts the details of each event and rates the event detail record according to the appropriate rule from the plurality of rules and rates present in the personalized product catalogue which is stored in the memory 203 of the user device 101. The rating process may be executed in two ways comprising file based rating and a real time rating. The real-time rating may be a process of taking event detail records as they may be generated and rated immediately, with as little delay as possible between event generation and costing. Whereas, in the file-based rating, event details are stored in a file buffer for hours, days, or weeks before the whole file is finally rated. Any application where events must be rated and applied quickly to the user's account is a suitable candidate for the real-time rating. The rating module may enable rating at intermediate points in time for long running services. In one example, the long running service like a Blackberry® data session may be available for usage for several days and in such case the rating may be done at periodic basis, say every hour or every 3 hours even though the session has not been terminated.

The rating module may automatically check to see if any rating time thresholds, including rating time discount thresholds, have been reached. The rating time thresholds help in protecting tele-com providers from lots of revenue loss. For example, a user may not be willing to pay more than his/her credit limit, in such case, it becomes necessary to terminate user's call as soon as it reaches to credit limit threshold. If the event requires to take rating time action, then it may be important to have real time rating.

In one implementation, the rating module may aggregate all non-recurring, periodic, and chargeable event detail records at regular time intervals. The rated event detail records are also the calculation of all outstanding charges and available discounts and bonuses. The output from rating process is a stream of tagged bill data that can be used to create a bill on paper, disk, or any other media. The rating module produces raw data having all the information required to generate a final bill and this raw data can be used to generate a final invoice for acknowledgement of the user.

In one implementation, the rating module may facilitate the user device 101 to directly pay the billed event detail records. The user can make payment using different payment methods that are supported by the user device 101 and the service provider; for example, the user can make payments using the payment methods like electronic check, or credit card or direct debit or electronic transfers, etc.

The below tables may illustrate the embodiments for rating the event according to the rating rules of the preselected service present in the product catalogue.

TABLE 5

| Event | Type of call | Plurality of rules | Rule selected | Rate (USD/Minute) | Rating |
|---|---|---|---|---|---|
| Voice call | A local call for 6 min with friends' circle | Local | No | 0.1 | 6 * 0.03 = .180 USD |
| | | Long distance | No | 0.2 | |
| | | International | No | 0.5 | |
| | | Roaming-incoming | No | 0.1 | |
| | | Roaming-outgoing | No | 0.2 | |
| | | Friends-local calls only as per selected plan | Yes | 0.03 | |
| | | Family- All calls | No | 0.02 | |
| | | Night hours | No | 0.02 | |

TABLE 6

| Event | Type of call | Plurality of rules | Rule selected | Rate (USD/message of 140 characters) | Rating |
|---|---|---|---|---|---|
| Text Messaging | A long distance text message with 280 characters | Local | No | 0.1 | 280/140 * 0.2 = 0.4 USD |
| | | Long distance | Yes | 0.2 | |
| | | International | No | 0.5 | |
| | | Roaming-outgoing | No | 0.2 | |
| | | Friends-local and Long distance | No | 0.03 | |
| | | Family- All | No | Free | |

TABLE 6-continued

| Event | Type of call | Plurality of rules | Rule selected | Rate (USD/message of 140 characters) | Rating |
|---|---|---|---|---|---|
| | | messages Night hours | No | 0.02 | |

TABLE 7

| Event | Type of call | Plurality of rules | Rule selected | Rate (USD/1 Megabyte) | Rating |
|---|---|---|---|---|---|
| Data usage | Data consumption of 15 MB made at home circle | Data consumption at home circle | Yes | 0.1 | 15 * 0.1 = 1.5 USD |
| | | Data consumption from circles other than home circle | No | 0.2 | |
| | | Data consumption for selected instant messengers | No | 0.01 | |
| | | Night hours | No | 0.02 | |

TABLE 8

| Event | Type of call | Plurality of rules | Rule selected | Rate (USD/Minute) | Rating |
|---|---|---|---|---|---|
| Television channels pack usage | A base pack with high definition channel pack further with first and second regional pack subscription and International channels pack | Base pack | Yes | 0.8 | 0.8 + 0 + 0.2 + 0.2 + 0.4 = 1.6 USD/day |
| | | First Regional Pack | Yes | Free | |
| | | Second regional Pack | Yes | 0.2 | |
| | | High Definition Subscription | Yes | 0.2 | |
| | | International Channels pack | Yes | 0.4 | |
| | | Single channel subscription | No | 0.1 | |

Recommendation and Analytic Module

In one implementation, the recommendation and Analytic module 209 may over a period of service data consumption and after analyzing the event detail record may further recommend the user for service plan with lower rate or with rates which may be beneficial than the current preselected one or more services.

In one implementation, the recommendation and analytic module 209 may be capable of enriching the consumption data related information or derive metadata pertaining the consumption data related information. For example, the recommendation and analytic module 209 may enrich the consumption data for voice calls to derive metadata indicating whether the call is long distance call/local call, whether the call is made within the proximity of a roaming network or a local network, whether the call is made at peak time, and the like. The recommendation and analytic module 209 may further use the metadata to develop usage patterns for respective users in order to recommend future products/services/offering based on the usage patterns.

Display Module

In one implementation, before processing any respective event, the user device 101 via the display module 210 may be enabled to display, to the user, network signal quality of multiple service providers, charge rates and a plurality of rating rules, one or more services and expected billing applicable to the process the said respective event thereby facilitating the user to select an appropriate service provider to process the said respective event The display module 210 may further display the final amount charged in processing the event during or after the execution of the event on the user device 101. Furthermore, the display module 210 may enable transparent display of rates and charges during the call based on type of event, at least one rating rule applied from the plurality of rules, and charge rate. The display module 210 may further display a notification signal indicating the user to select a lowest rated service belonging to one or more service providers in order to process the event. During the event processing, the user device may be enabled to display, to the user, the real-time cost of the event and a remaining usage till the time that cost holds true. Further, the display module 210 may provide another notification signal indicating to continue with consumption of a particular service for predetermined time interval at the expiry of which the bill for the service consumed will be exactly similar to the bill if the same event is terminated at the start of the said predetermined time interval. The display module, 210 may further display, based on the monitoring of the usage pattern over a period of time by the recommendation and analytic module 209, offers/services/products matching with the said usage patterns.

In one implementation, the processor 201 may execute the instructions to be performed by in the user device to extract and allocate data. The processor 201 may access the product catalogue when an event is triggered for establishing a communication for selecting the rate to be applied for the event. The processor 201 may be enabled to ensure that data present as well as generated within the user device is stored, archived or disposed-off in a safe and secure manner during or after the termination of the event. The processor 201 may be enabled to follow the protocols provided by the user, the communication provider, the network or the user device. The protocols may comprise development of policies and procedures to manage data electronically.

In another implementation, the entire process of rating may include data capturing, segmenting, forecasting, optimizing and re-evaluating. Relevant data is of paramount importance for the rating module 208 to derive accurate and actionable information. The processor 201 may enable the user device to collect and store historical data for inventory, prices, demand, and other causal factors. Any data that reflects the details of products offered, their prices, competition, and user behavior must be collected, stored, and analyzed. In some markets, specialized data collection methods have rapidly emerged to service their relevant sector, and sometimes have even become a norm. To support this scenario, the user devices are utilized to collect data and make available for commercial purposes. The data is also utilized for financial reporting, forecasting trends and development purposes. Information about user behavior is a valuable asset that can reveal user behavioral patterns, the impact of competitors' actions, and other important market information.

In yet another implementation, the rating and billing of one or more event data records may be comprise processes further comprising formatting of one or more event details records, rating of event details records and billing of the rated event detail records. The processor may format all the event detail records and may convert the event detail records into a format compatible to the rating module 208. The rating module 208 may apply one or more rules from the plurality of rules present in the product catalogue on one or more event detail records for implementing the rating process.

In an embodiment, the processor may further filter out all the event detail records, which may have been failed while establishing a communication or have a poor quality of communication. In such scenarios, the communication established is non chargeable and of no use to the user, user device or network. In an implementation, the data monitoring module 207 may provide some additional attributes available within the event details records which may be critical for the rating or billing. Once the captured event detail records are processed and rated, the rating module 208 may transfer all the event detail records for further billing. The processor may enable the user device to process the payment via a URL associated with the payment gateway as provided in the updated product catalogue. In another embodiment, the processor may enable the user to select a payment method, such as credit card, mobile wallet, debit card, etc., and make payment using the user selected payment method and further process the payment. In an implementation, after billing the event detail records the processor may update user's profile in the database with the total outstanding balance to be paid by the user, and next billing co-ordinates, etc. The rating module 208 may further analyze the event data records for discounts comprising cross product discount, tiered discount, volume discount and tax discount.

In an embodiment, the personalized product catalogue comprising a plurality of rating rules within the user device 101 eliminates all the back process for rating and billing which may usually occur at the central control point which may incorporate massive servers and processors. The distributed framework of billing may also eliminate the hardware required to capture and send the event detailed records from a plurality of user devices 101 to the central control point. The rating of the event corresponding to the user does not depend on the central control point resulting independent rating of each event. Furthermore, in current practice event detail records may be captured by the network collectors which may be situated at cellular regions, and the said collectors send the event data records to the central station for further processing in order to rate and bill the event detail records. The capturing and sending of the event data records by the collectors may create interference of the communication network waves and may further cause noise and network congestion. Since, the present disclosure enables capturing and processing of the event detail records by the user device 101, the event detail records need not be transmitted to the central stations for the processing thereby reducing the interference of network waves and the noise created as observed in the existing scenario. The present disclosure also transfers the overload processing occurring at the central control point to the plurality of user device 101 in the distributed manner.

Figure 3:
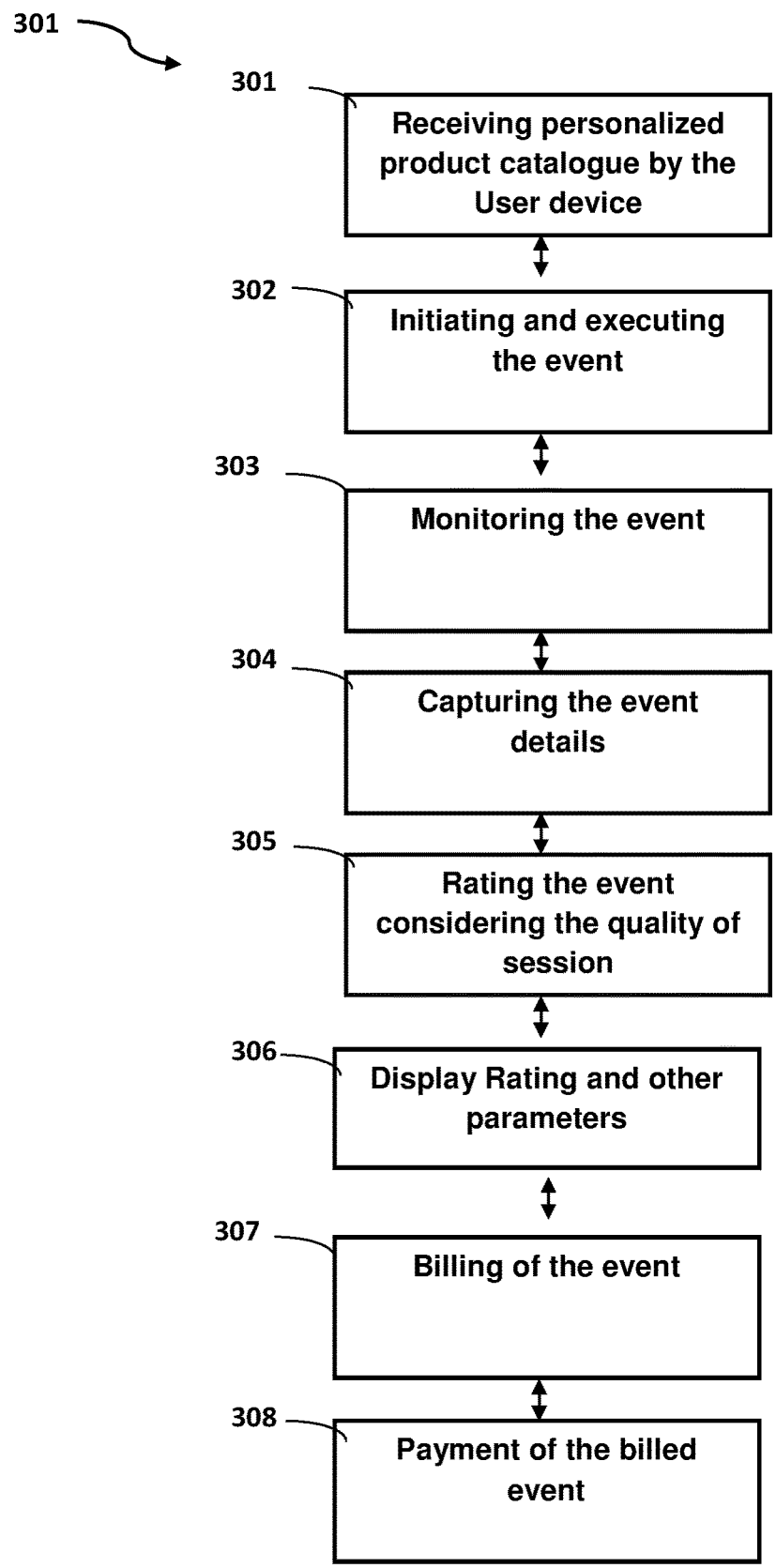
FIG. 3 illustrates a method 300 for real time processing rating associated with one or more telecommunication services, in accordance with an embodiment of the present subject matter.

Referring now to FIG. 3, a method 300 for rating an event within the user device 101 is shown, in accordance with an embodiment of the present subject matter. The method 300 may be described in the general context of computer executable instructions. Generally, computer executable instructions can include routines, programs, objects, components, data structures, procedures, modules 203, functions, etc., that perform particular functions or implement particular abstract data types. The method 300 may also be practiced in a distributed computing environment where functions are performed by remote processing devices that are linked through a communications network 103. In a distributed computing environment, computer executable instructions may be located in both local and remote computer storage media, including memory 203 storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described user device 101.

At block 301, the user device 101 receives the personalized product catalogue comprising one or more telecommunication services, wherein the one or more telecommunication services belongs to one or more service providers, and wherein the personalized product catalogue further comprises a plurality of rules associated with rating of each of consumption or subscription of one or more telecommunication services and comprising of only the offers that are applicable to the user and any related data that would be necessary for rating the one or more telecommunication services. The personalized product catalogue may be stored in the memory 203 of the user device 101 and further the personalized product catalogue may be updated from time to time between specified time intervals or as and when the user subscribes to an offer or unsubscribes to an offer or an offer that the user had subscribed to has been modified or an offer that user had subscribed to has been expired.

At block 302, in order to establish communication with colleague, friends or family members or for updating the user device, a trigger is initiated. The communication may be established for a voice call, a text message, an internet data consumable instant message or any other event which is chargeable and feasible according to the user.

At block 303, the user device 101 may automatically monitor the event within the user device 101 for categorization of the event and for detailing the event. The user device 101 may monitor the event with parameters comprising event executed by a user, event executed from other user to a user, event staring time, duration of the event and event type.

At block 304, the user device 101 may capture the event detail records of one or more events during the execution of the event. Further, the file of the event detail record may be stored and updated using incremental or differential back up for each new occurred event.

At block 305, the user device 101 may further call all the event detail records for rating the event detail record associated with each event based on the consumption data and other data related to the event for applying at least one rule from the plurality of rules. In one embodiment, the rating of the event may be based on quality of the event. In one example, the user device 101 may skip to rate an event wherein quality of that event was less than predefined threshold value. Alternatively, the user device 101 may rate the event lower than the rating rule stored for that event in the personalized catalogue.

At block 306, the display module before processing any respective event, the user device 101 via the display module 210 may be enabled to display, to the user, network signal quality of multiple service providers, charge rates and a plurality of rating rules, one or more services and expected charge applicable to the process the said respective event thereby facilitating the user to select an appropriate service provider to process the said respective event.

At block 307, the user device 101 may produce a bill within the user device 101 based on the rated event data record and may further produce a bill which may be displayed on the user device 101. The user device 101 may further apply discount to the bill if applicable according to the rules present in the product catalogue.

At block 308, the user may pay the bill by linking the user device 101 directly to the payment gateway dedicated for the communication service provider.

In an embodiment, the user device 101 shown in FIG. 1 may be implemented as an Internet of Things (IoT) device (hereinafter referred as IoT device 101) present within an IoT network. Further, in this embodiment, the processor 201 of the IoT device 101 may act as a chip (hereinafter referred as a chip 201) enabling telecommunication services through a thin application stored within the said chip 201. In this embodiment, the chip 201 using the said thin application may be configured to implement the aforementioned method 300 associated with the rating and billing of the telecommunication services within the said chip 201 of the IoT device 101.

Although implementations for methods and systems for real time processing of an event associated with one or more telecommunication services have been described in language specific to structural features and/or methods, it is to be understood that the appended claims are not necessarily limited to the specific features or methods described. Rather, the specific features and methods are disclosed as examples of implementations for real time processing of an event associated with one or more telecommunication services.

I claim:

1. A method for processing rating of one or more telecommunication services, the method comprising:
receiving, via a user device, a personalized product catalogue comprising the one or more telecommunication services subscribed by a user of the user device, wherein the one or more telecommunication services belongs to one or more telecommunication service providers, wherein the personalized product catalogue is stored in the user device, and wherein the one or more telecommunication services in the personalized product catalogue are generated based on past service consumption pattern of the user of the user device for a predefined time interval, and wherein the personalized product catalogue further comprises a plurality of rules associated with rating of consumption of the one or more telecommunication services, and wherein the rating is indicative of charges applicable corresponding to each of the one or more telecommunication services within the personalized product catalogue to be utilized for processing one or more events in a telecommunication network;

monitoring, via the user device, an event triggered for establishing a communication in a real-time, wherein the event is one or more of a voice call, a short text message, an Internet data streaming, and a multimedia message, wherein the event further comprises information associated with the event, wherein the information comprises one or more of event day, event time, event duration, event length, and event location;

deriving metadata pertaining to current consumption data based upon the event being monitored in real-time, wherein the metadata is indicative of at least whether the event is a long distance event or a local event, whether the event is triggered within a vicinity of a home network or a roaming network, whether the event is triggered at a peak time, and whether the event is triggered for communication within a friend circle or a family circle;

determining current usage pattern and future predicted usage pattern for the user in real-time based upon the metadata derived pertaining to the current consumption data; and automatically recommending one or more future telecommunication services to the user in real-time based upon the current usage pattern and the future predicted usage pattern determined for the user, wherein each of the one or more future telecommunication services is distinct from the one or more telecommunication services previously stored within the personalized product catalogue; and automatically updating the personalized product catalogue in real-time, wherein the personalized product catalogue is updated with the one or more future telecommunication services and one or more rules of the plurality of rules associated with rating of consumption of the one or more future telecommunication services.

2. The method of claim 1, wherein the plurality of rules comprises only offers applicable to the user and data related for the rating of the one or more telecommunication services.

3. The method of claim 1 further comprising updating, via the user device, the personalized product catalogue at predefined time intervals or when the user subscribes or unsubscribes to an offer or an offer subscribed by the user has been modified or expired.

4. The method of claim 1, wherein the one or more telecommunication services comprises radio network services, satellite television network services, Internet services, Wi-Fi services, Bluetooth services, near field communications services and combinations thereof.

5. The method of claim 1, wherein the consumption of each telecommunication service of the one or more telecommunication services is indicative of the telecommunication service being consumed from initiation and termination of an event or after execution of the event or at intermediate points in time for long running services.

6. The method of claim 1, wherein each rule of the plurality of rules is indicative of rating the event based on type of the event and a type of telecommunication service consumed for processing the event.

7. The method of claim 1 further comprising displaying, via the user device to the user, before processing the event, charge rates, one or more rating rules, the one or more telecommunication services and at least one future telecommunication service updated within in the personalized product catalogue and expected billing applicable to the event as-well-as the network signal quality of multiple service providers.

8. The method of claim 1 further comprising displaying, via the user device to the user, during the event, a real-time cost of the event and a remaining usage till the event time that cost holds true.

9. The method of claim 7 further comprising displaying, via the user device, one or more notification signals indicative of the one or more telecommunication services being updated in the personalized product catalogue, and continue or terminate an event based on the type of the event and at least one rule applicable to the event.

10. The method of claim 1, wherein the event determined as the voice call is rated based upon a first set of rules of the plurality of rules comprising: rating the voice call identified as a local voice call at a specified rate therefor, rating the voice call identified as a long distance voice call at a specified rate therefor, rating the voice call identified as an International voice call at a specified rate therefor, rating the voice call identified as a roaming-outgoing voice call at a specified rate therefor, rating the voice call identified as a voice call within a friends circle at a specified rate therefor, rating the voice call identified as a voice call within a family circle at a specified rate therefor, and rating the voice call identified as a voice call during night hours at a specified rate therefor.

11. The method of claim 1, wherein the event determined as the short text message is rated based upon a second set of rules of the plurality of rules comprising: rating the short text message identified as a local short text message at a specified rate therefor, rating the short text message identified as a long distance short text message at a specified rate therefor, rating the short text message identified as an International short text message at a specified rate therefor, rating the short text message identified as a roaming-outgoing short text message at a specified rate therefor, rating the short text message identified as a short text message within a friends circle at a specified rate therefor, rating the short text message identified as a short text message within a family circle at a specified rate therefor, and rating the short text message identified as a short text message during night hours at a specified rate therefor.

12. The method of claim 1, wherein the event determined as the Internet data streaming is rated based upon a third set of rules of the plurality of rules comprising rating data consumed from a home circle at a specified rate therefor, rating data consumed from any circle other than the home circle at a specified rate therefor, rating data consumed from selected Instant Messengers at a specified rate therefor, and rating data consumed during night hours at a specified rate therefor.

13. The method of claim 1, wherein the event determined as a television channel access is rated based upon a fourth set of rules of the plurality of rules comprising rating the television channel from a base pack at a specified rate therefor, rating the television channel from a first regional pack at a specified rate therefor, rating the television channel from a second regional pack at a specified rate therefor, rating the television channel from a High Definition (HD) pack at a specified rate therefor, and rating the television channel from an International Channels pack at a specified rate therefor.

14. A user device for real-time processing of rating associated to one or more telecommunication services, the user device comprising:
   a processor; and a memory coupled with the processor, wherein the processor is capable of executing programmed instructions stored in the memory for:

receiving a personalized product catalogue comprising the one or more telecommunication services subscribed by a user of the user device, wherein the one or more telecommunication services belongs to one or more telecommunication service providers, wherein the personalized product catalogue is stored in the user device, and wherein the one or more telecommunication services in the personalized product catalogue are generated based on service consumption pattern of the user of the user device for a predefined time interval, and wherein the personalized product catalogue further comprises a plurality of rules associated with rating of consumption of the one or more telecommunication services, and wherein the rating is indicative of charges applicable corresponding to each of the one or more telecommunication services within the personalized product catalogue to be utilized for processing one or more events in a telecommunication network;

monitoring an event triggered for establishing a communication in a real-time, wherein the event is one or more of a voice call, a short text message, an Internet data streaming, and a multimedia message, wherein the event further comprises information associated with the event, wherein the information comprises one or more of event day, event time, event duration, event length, and event location;

deriving metadata pertaining to current consumption data based upon the event being monitored in real-time, wherein the metadata is indicative of at least whether the event is a long distance event or a local event, whether the event is triggered within a vicinity of a home network or a roaming network, whether the event is triggered at a peak time, and whether the event is triggered for communication within a friend circle or a family circle;

determining current usage pattern and future predicted usage pattern for the user in real-time based upon the metadata derived pertaining to the current consumption data; and automatically recommending one or more future telecommunication services to the user in real-time based upon the current usage pattern and the future predicted usage pattern determined for the user, wherein each of the one or more future telecommunication services is distinct from the one or more telecommunication services previously stored within the personalized product catalogue; and automatically updating the personalized product catalogue in real-time, wherein the personalized product catalogue is updated with the one or more future telecommunication services and one or more rules of the plurality of rules associated with rating of consumption of the one or more future telecommunication services.

15. The user device of claim 14, wherein the plurality of rules comprises only offers applicable to the user and data related to the rating of the one or more telecommunication services.

* * * * *